United States Patent
Vanderpool et al.

(10) Patent No.: US 11,868,342 B2
(45) Date of Patent: Jan. 9, 2024

(54) SYSTEMS AND METHODS FOR GENERATING DYNAMIC INSTRUCTIONS FOR DATABASE QUERYING AND DATA RETRIEVAL

(71) Applicant: Walmart Apollo, LLC, Bentonville, AR (US)

(72) Inventors: Clifford Virgil Vanderpool, Bentonville, AR (US); Aroon Ponnusamy, Centerton, AR (US); Bryant Matthew Lane, Pea Ridge, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 171 days.

(21) Appl. No.: 17/362,573

(22) Filed: Jun. 29, 2021

(65) Prior Publication Data
US 2022/0414091 A1   Dec. 29, 2022

(51) Int. Cl.
*G06F 16/245*    (2019.01)
*G06F 16/248*    (2019.01)

(52) U.S. Cl.
CPC .......... *G06F 16/245* (2019.01); *G06F 16/248* (2019.01)

(58) Field of Classification Search
CPC .............................. G06F 16/245; G06F 16/248
See application file for complete search history.

(56) References Cited

U.S. PATENT DOCUMENTS

| | | | |
|---|---|---|---|
| 7,539,776 B1* | 5/2009 | Saare | G06F 16/9566 709/230 |
| 9,513,941 B2 | 12/2016 | Feng et al. | |
| 10,025,599 B1* | 7/2018 | Goodson | G06F 16/00 |
| 10,719,374 B1 | 7/2020 | Mathur et al. | |
| 11,556,229 B2* | 1/2023 | Singh | G06F 3/0484 |
| 2008/0222656 A1* | 9/2008 | Lyman | H04L 51/04 719/318 |
| 2009/0299978 A1* | 12/2009 | Farfurnik | G06F 16/9566 |
| 2009/0327304 A1* | 12/2009 | Agarwal | G06F 16/955 |
| 2015/0095362 A1* | 4/2015 | Guilford | G06F 16/9566 709/219 |

(Continued)

OTHER PUBLICATIONS

DreamFactory, "Automatically Generate APIs for all common databases and other data sources," DreamFactory Features—API Generation, Jun. 28, 2021, https://www.dreamfactory.com/benefits/api-generation/, 4 pages.

(Continued)

*Primary Examiner* — Alicia M Willoughby
(74) *Attorney, Agent, or Firm* — Morgan, Lewis & Bockius LLP; Manita Rawat (57) ABSTRACT

A data retrieval system can include a computing device that is configured to, in response to receiving a uniform resource locator from a user device, parse the uniform resource locator to identify a dynamic path variable. The computing device can be configured to generate a set of execution steps based on the received uniform resource locator. The computing device can also be configured to execute the set of execution steps to retrieve a set of data, the set of execution steps being executed based on the dynamic path variable in response to the dynamic path variable being identified. The computing device can further be configured to transform a user interface of the user device based on the set of data.

20 Claims, 7 Drawing Sheets

(56) References Cited

U.S. PATENT DOCUMENTS

| | | | | |
|---|---|---|---|---|
| 2015/0254294 | A1* | 9/2015 | Marais | G06F 16/275 707/690 |
| 2016/0127803 | A1* | 5/2016 | Shanson | H04N 21/222 725/32 |
| 2016/0335062 | A1* | 11/2016 | Teodorescu | G06F 16/9566 |
| 2016/0350378 | A1* | 12/2016 | Trevor | G06F 16/24545 |
| 2017/0060562 | A1* | 3/2017 | Lopez | G06F 8/60 |
| 2018/0081893 | A1* | 3/2018 | Juneja | G06F 16/9038 |
| 2021/0150412 | A1* | 5/2021 | Rashidi | G06N 20/00 |
| 2021/0377332 | A1* | 12/2021 | Ray | G06F 16/9574 |
| 2022/0207034 | A1* | 6/2022 | Norrby | G06F 16/2457 |
| 2022/0237254 | A1* | 7/2022 | Li | G06F 40/106 |

OTHER PUBLICATIONS

DreamFactory, "Using Active Directory," Using Active Directory—DreamFactory, Jun. 28, 2021, https://wiki.dreamfactory.com/DreamFactory/Tutorials/Using_Active_Directory, 3 pages.

DreamFactory, "Generating a Database-backed API," Generating a Database-backed API | DreamFactory, Jun. 28, 2021, https://guide.dreamfactory.com/docs/generating-a-database-backed-api, 20 pages.

DreamFactory, "Records," Records—DreamFactory, Jun. 28, 2021, https://wiki.dreamfactory.com/DreamFactory/Features/Database/Records, 13 pages.

DreamFactory, "Create Custom Error Messages," Dreamfactory Developer Portal, Jun. 28, 2021, https://www.dreamfactory.com/developers/scripts/create-custom-error-messages, 3 pages.

DreamFactory, "Using Cache Service," Using Cache Service—DreamFactory, Jun. 28, 2021, https://wiki.dreamfactory.com/DreamFactory/Tutorials/Using_Cache_Service, 5 pages.

DreamFactory, "Auth," Auth—DreamFactory, Jun. 28, 2021, https://wiki.dreamfactory.com/DreamFactory/Features/Auth, pages.

PrestoAPI, "Introduction," Getting Started—PrestoAPI, Jun. 29, 2021, https://prestoapi.com/docs/getting-started/introduction, 2 pages.

PrestoAPI, "Quick Start," Quickstart—PrestoAPI, Jun. 29, 2021, https://prestoapi.com/docs/getting-started/quickstart, 5 pages.

Progress Software Corporation, "Managing Isolation Level," Managing Isolation Level, Jun. 28, 2021, https://docs.telerik.com/data-access/feature-reference/api/context-api/context-options/feature-ref-api-context-api-managing-isolation-level, 1 page.

Cloudflare, "Search the Cloudflare Support knowledge base," Customizing Cloudflare's cache—Cloudflare Help Center, Jun. 29, 2021, https://support.cloudflare.com/hc/en-us/articles/202775670, 5 pages.

Microsoft, "Use a union query to combine multiple queries into a single result—Acces," https://support.microsoft.com/en-us/office/use-a-union-query-to-combine-multiple-queries-into-a-single-result-1f772ec0-cc73-474d-ab10-ad0a75541c6e, Jun. 29, 2021, 8 pages.

Oracle, "TimesTen In-Memory Database PL/SQL Developer's Guide," Oracle Help Center, 11 pages.

* cited by examiner

SYSTEMS AND METHODS FOR GENERATING DYNAMIC INSTRUCTIONS FOR DATABASE QUERYING AND DATA RETRIEVAL

TECHNICAL FIELD

The disclosure relates generally to systems and methods for generating dynamic instructions for database querying and data retrieval.

BACKGROUND

Today, most backend development efforts include operations to access data included in particular databases. To achieve that, each project or team is building an application to perform operations that involves defining the payload, coding, testing, implementation, and support. Therefore, completing the application involves months of effort based on the complexity of the application. Further, even if a new object is needed in the response or an additional operation has to take place then the development team has to go through a solid amount of effort to achieve this. In multiple instances, the development team may choose to create an entirely new application.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The embodiments described herein are directed to a data retrieval system and related methods. The data retrieval system can include a computing device that is configured to, in response to receiving a uniform resource locator from a user device, parse the uniform resource locator to identify a dynamic path variable. The computing device can be configured to generate a set of execution steps based on the received uniform resource locator. The computing device can also be configured to execute the set of execution steps to retrieve a set of data, the set of execution steps being executed based on the dynamic path variable in response to the dynamic path variable being identified. The computing device can further be configured to transform a user interface of the user device based on the set of data.

In another aspect, generating the set of execution steps based on the received uniform resource locator includes retrieving a set of instructions from an instructions database, identifying a set of models included in the set of instructions, and generating the set of execution steps based on the set of instructions and the set of models.

In another aspect, the computing device is configured to, in response to a first model of the set of models being independent of a second model of the set of models, generate the set of execution steps corresponding to the first model and the second model in parallel.

In another aspect, the set of instructions includes input from the user device indicating: at least one database, the dynamic path variable, a query string variable, a header value variable, or a request payload variable.

In another aspect, the set of instructions indicate data to retrieve from at least one database, and the set of models indicate a location of the data to retrieve.

In another aspect, the set of execution steps are generated based on a set of instructions and a set of models selected via the user device.

In another aspect, the computing device is configured to store the set of data for a threshold period.

In various embodiments of the present disclosure, a method of retrieving data is provided. In some embodiments, the method can include, in response to receiving a uniform resource locator from a user device, parsing the uniform resource locator to identify a dynamic path variable. The method also includes generating a set of execution steps based on the received uniform resource locator. The method can further include executing the set of execution steps to retrieve a set of data, the set of execution steps being executed based on the dynamic path variable in response to the dynamic path variable being identified. The method can also include transforming a user interface of the user device based on the set of data.

In various embodiments of the present disclosure, a non-transitory computer readable medium is provided. The non-transitory computer readable medium can have instructions stored thereon, wherein the instructions, when executed by at least one processor, cause a device to perform operations that include, in response to receiving a uniform resource locator from a user device, parsing the uniform resource locator to identify a dynamic path variable. The operations can also include generating a set of execution steps based on the received uniform resource locator. The operations can further include executing the set of execution steps to retrieve a set of data, the set of execution steps being executed based on the dynamic path variable in response to the dynamic path variable being identified. The operations can additionally include transforming a user interface of the user device based on the set of data.

BRIEF DESCRIPTION OF THE DRAWINGS

The features and advantages of the present disclosures will be more fully disclosed in, or rendered obvious by, the following detailed descriptions of example embodiments. The detailed descriptions of the example embodiments are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "connected," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

To streamline and to automate the creation of backend web application programming interfaces (APIs), a data retrieval system creates a data retrieval application or built code instantly accessible by a unique uniform resource location (URL). The unique URL may include a dynamic path variable, allowing the user entering the unique URL to identify a different dynamic variable in the unique URL path. Further, dynamic variable may be in the path of the unique URL along with in a query string, a header, a request/response variable, etc. that modify data retrieval models to obtain data within certain parameters, based on a particular name, etc., without having to build a new data retrieval application. That is, the dynamic path variable and dynamic variables allow for transformation of variables in the path, header, query string, request and response sections to format dates, convert strings to numerics, encode to/from base64 for binary data and special encoding for different code pages.

The data retrieval system receives user input through a user device from which the data retrieval application is generated. For example, the data retrieval system receives database connection information, user credentials, data retrieval models to operate, a set of retrieval instructions, and the unique URL to generate the data retrieval application, which operates based on built execution steps.

In various implementations, the database connection information may be in the form of Java Database Connectivity (JBDC) strings that connect the data retrieval system to a plurality of databases from which data can be retrieved. Further, the user credentials can be specific to the user, such as a user identifier and a corresponding password or a certificate with a passphrase. Particular users may only have access to certain data within the plurality of databases; therefore, the provided user credentials offer the user access to that data and the corresponding databases. The data retrieval models may be preset definitions, for example, a set of structured query languages (SQLs), that indicate what is being obtained from the query. For example, an invoice SQL definition may be named "invoice" and include the following in the SQL definition:

| select | invoice_date |
| from | invoice |
| where | invoice_id = :path.invoiceId |

In the above example, the SQL definition indicates that when the set of instructions implements the invoice SQL, the invoice SQL will obtain or select the "invoice_date" from an "invoice" data structure based on the dynamic path variable which is going to indicate what "invoice_id" to query. The set of instructions may be in the form of JavaScript Object Notation (JSON) request and response payloads. Here, for example, the set of instructions in JSON would be: "invoiceDate": "{invoice.invoice_date}". In various implementations, when the set of instructions are surrounded by "{" and "}", the data retrieval system understands that the instruction is indicating single row processing, meaning a single row of data is being retrieved (here, the invoice_date). Alternatively, if the set of instructions are surrounded by "[" and "]", the data retrieval system understands that the instruction is indicating an array of values is being requested and allows for multiple rows to be returned from the request.

An example of multiple row processing may include an invoice SQL definition of:

| select | invoice_id, |
| | vendor_nbr |
| from | invoice |
| where | invoice_date = :path.invoiceDate |

The set of instructions in JSON would then include:

```
[
  {
    "invoiceId" : "{invoice.invoice_id}",
    "vendorNbr" : "{invoice.vendor_nbr}"
  }
]
```

For example, in the above example, upon entering the corresponding unique URL with the dynamic path variable, the data retrieval system would return an invoice_id and a vendor_nbr included in the invoice data structure that corresponds to the input invoiceDate (input as the dynamic path variable), allowing the user to change which invoiceDate is entered (retrieving different information) without having to create a new set of instructions and building a new data retrieval application.

In various implementations, the set of instructions may also be preset request and response payloads in JSON that the user can select when generating their querying code. The user can then make any adjustments to the querying code in JSON to define which data retrieval models will be invoked. The user also provides the unique URL including the dynamic path variable that the user can change when entering the unique URL to define, for example, as shown above a different "invoice_id" of the first example and a different "invoice_date" in the second example.

As noted above, the data retrieval system builds execution steps of the data retrieval application based on the set of instructions and the data retrieval models that the user selects and adjusts within a code generation user interface. For example, the data retrieval application of the above second example showing multiple row processing may include the following execution steps:

| 1. | Initialize buffers |
| 2. | Execute "invoice" model (SQL definition) |
| 3. | Read "invoice" model row |
| 4. | Write "[" text |

```
 5. Write "{" text
 6. Write "invoice_id" from query
 7. Write "vendor_nbr" from query
 8. Write "}" text
 9. Read "invoice" model row, if additional data return to 5
10. Write "]" text
11. Write buffer
12. End service
```

The execution steps or built code indicates instructions for data retrieval. In various implementations, the execution of the execution steps may store the data retrieved as a result of the execution steps in a local memory as well as with the execution steps. That is, the data retrieval system generates a unique URL linking the system to the set of instructions to build or generate the executions steps at runtime or when the unique URL is submitted. The retrieved data of the unique URL, also known as the response payload, may be stored in a local memory for a set amount of time (as indicated in a link request) to store the retrieved data locally for simplicity of future retrieval. For example, if the execution steps instruct the retrieval of a set of invoices from a particular date, after the steps are executed, the set of invoices is stored in the local memory for future retrieval if the system requests the set of invoices on the particular date again. Through the code generation user interface, the user may indicate a cache time frame indicating how long to store the retrieved data for later use (by the user entering the unique URL) in the local memory. For example, the cache time frame may indicate a number of hours to store the execution steps, a time at which to purge the database of the execution steps, etc.

Additionally, the user may customize the isolation levels of the data retrieval models, define acceptable errors when the models are executed in order to pass on to the next statements, chain data retrieval models based on events including on success, on duplicate, on not found, etc. Further, the data retrieval system may operate in a first dynamic processing mode that passes one or more data retrieval models or in a second instant processing mode that defines custom sets of instructions (such as custom request and response payloads) that execute one or more data retrieval models according to the custom set of instructions or defined data structures.

That is, in the first dynamic processing mode, the code generation interface offers predefined models for the data retrieval models as well as predefined sets of instructions (for example, GET, PUT, POST, DELETE operations offered in REST APIs). Additionally, the data retrieval models may be executed serially (consecutively), threaded (in parallel), or using a unit of work mode. Executing serially would occur when a data retrieval model is dependent on data retrieved from another model. Therefore, the data retrieval models would operate in a particular order and not in parallel. Executing in a threaded manner would occur when each data retrieval model operates independent of the other and does not require any data retrieved from another model, improving response times of the data retrieval system. Implementing the unit of work option would execute the data retrieval models serially, allowing the data retrieval system to undo or rollback changes if a particular data retrieval model is not successful.

In the second processing mode, the data retrieval system provides manipulation of the data retrieval models, the sets of instructions, and the dynamic path variable provided in the unique URL. For example, as shown above, the dynamic path variable included at the end of the unique URL may replace or define variables in the data retrieval models. Further, the dynamic path variable can include special directives indicated by a tilde. These special directives may include: "~={value}", which directs the "where" statement in the data retrieval model that column_name={value}; "~>{value}", which directs he "where" statement in the data retrieval model that column_name>{value}; "~<{value}", which directs the "where" statement in the data retrieval model that column_name<{value}; "~>={value}", which directs the "where" statement in the data retrieval model that column_name>={value}; "~<={value}", which directs the "where" statement in the data retrieval model that column_name<={value}; "~[{value}, {value}, {value}]", which directs the "where" statement in the data retrieval model that column_name in ({value}, {value}, {value}); "~<{value1}, {value2}>", which directs the "where" statement in the data retrieval model that column_name that between {value1} and {value2}; "~!{value}", which directs the "where" statement in the data retrieval model that column_name NOT={value}; "~% {value}", which directs the "where" statement in the data retrieval model that column_name like {value}; and "{{column_name=:path.value}}", is the path directive modifier in the data retrieval model.

Moreover, the data retrieval system may execute interconnected data mapping of the set of instructions. That is, the set of instructions can connect multiple defined data maps by indicating in map directives to map or input indicated data to a particular data structure. Additionally, the set of instructions may include special directives, such as "~null_on_empty" or "~drop_on_empty".

The data retrieval system can also generate a plurality of unique URLs and different versions of the data retrieval applications. The set of instructions can also indicate in a retrieval path from which database to retrieve the data, providing the option of the set of instructions accessing multiple databases in a single set of execution steps. That is, a first instruction of the set of instructions references a first database while a second instruction of the set of instructions references a second database. The database may also be indicated in the unique URL.

Additional special directives may be included in the set of instructions indicating formatting information, such as "~number" indicating to the data retrieval system to override default formatting and return any string in a number form. Another special directive may be "~o_datetime ('YYYYMMDD')" indicating date format. In various implementations, the data retrieval system also includes user-selectable links on the code generation user interface to allow the data retrieval application to be promoted from a test environment to QA to production, which may seamlessly update environment based definitions according to the updated environment.

Moreover, each data retrieval application created using the data retrieval system may have multiple versions. In various implementations, a particular data retrieval application may have multiple versions and one of those versions is identified as a default version of the particular data retrieval application. Each version of the particular data retrieval application may also be promoted from the test environment to QA to production upon selection of a user-selectable link or icon to promote the version. Further, another user-selectable button, for example a GLOB button, may be arranged next to each version and selected to set that particular version as the default version of that particular data retrieval application. For example, a newest version may be selected as a default version, but, if the newest version produces unintended results, the user may set an earlier version as the default version. While a user can access any version by indicating a version number in the unique URL path, when a version is set as the default version, the default version is automatically selected when a version number is excluded from the unique URL path. In various implementations, the data retrieval system may automatically upgrade or backout of the data retrieval application.

Figure 1:
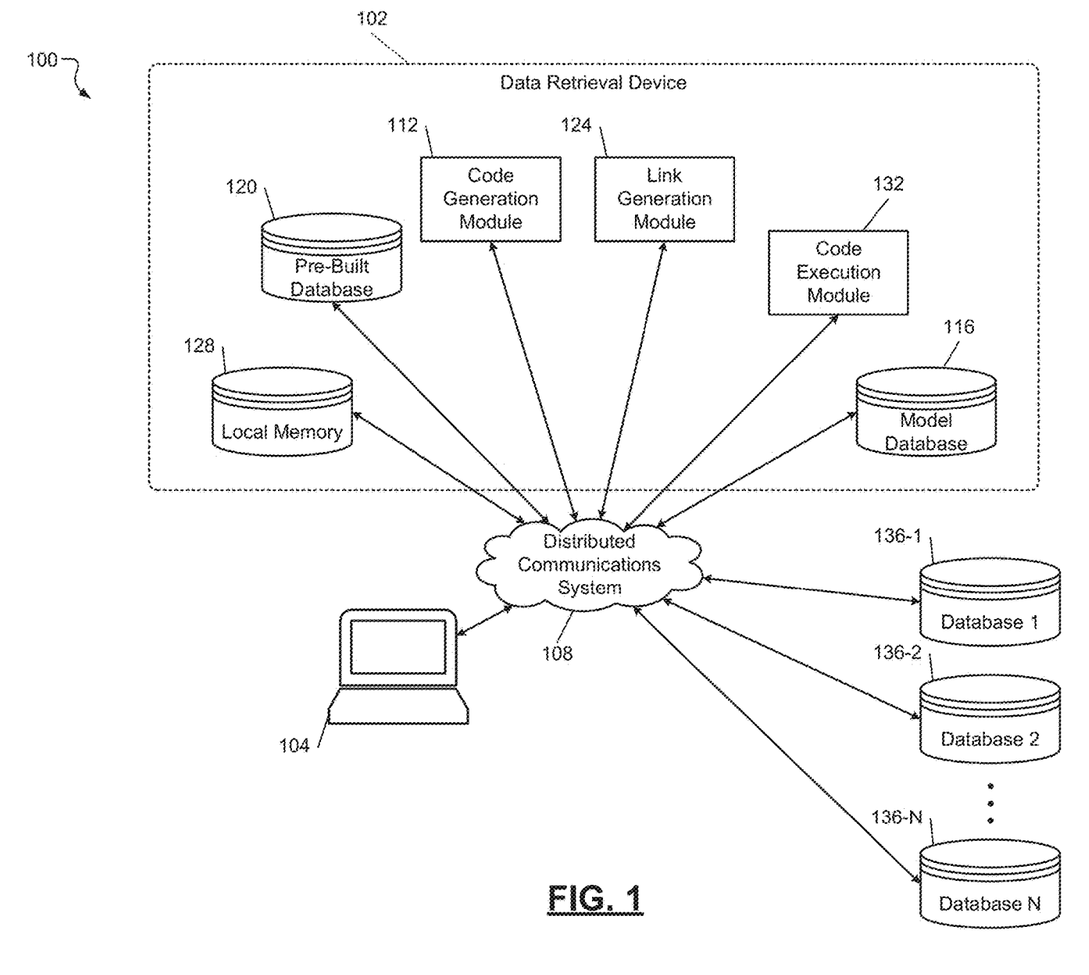
FIG. 1 is a block diagram of a data retrieval system in accordance with some embodiments.

Referring to FIG. 1, a block diagram of a data retrieval system 100 is shown. The data retrieval system 100 may include a data retrieval device 102 and a user device 104, such as a phone, tablet, laptop, mobile computing device, desktop, etc., that interacts with the data retrieval device 102 via a distributed communications system 108. A user may interact with a code generation module 112 that displays a code generation user interface on the user device 104 allowing the user to combine data retrieval models and sets of instructions. In various implementations, the code generation module 112 may retrieve predefined data retrieval models (and in some instances predefined sets of instructions) in a model database 116. As mentioned previously, in various implementations, the user may access the predefined models and/or instructions via the code generation module 112 and modify or manipulate the predefined models and/or instructions for a personalized data retrieval application.

A user may also enter their own set of instructions on the code generation user interface via the user device 104 and call the data retrieval models to create the data retrieval application. In various implementations, prior to the execution steps of the data retrieval application being built, the data retrieval device 102 may store the set of instructions and identified data retrieval models in a pre-built database 120. In various implementations, a link generation module 124 can combine the unique set of instructions and identified data retrieval models from the pre-built database 120 to associate the unique set of instructions and data retrieval models of the data retrieval application. Then, the link generation module 124 can create a unique URL that, when submitted, links to the created, unique set of instructions included in the pre-built database 120. Upon submission of the unique URL, a code execution module 132 may generate or build, at runtime, the execution steps based on the unique set of instructions linked to the unique URL. In various implementations, the code execution module 132 may check a local memory 128 to determine if the unique URL was previously entered or submitted and the execution steps were built and stored in the local memory 128. Upon receiving the user-entered unique URL, the data retrieval device 102 executes the corresponding execution steps (and if necessary, builds those execution steps at runtime) of the data retrieval application and obtains the indicated data from one of the indicated databases, such as database 1, 136-1, database 2, 136-2, . . . , and/or database N, 136-N.

The data retrieval device 102 and the user device 104 can each be any suitable computing device that includes any hardware or hardware and software combination for processing and handling information. For example, the term "device" and/or "module" can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, the distributed communications system 108. In various implementations, the devices, modules, and databases may communicate directly on an internal network.

As indicated above, the data retrieval device 102 and/or the user device 104 can be a computer, a workstation, a laptop, a server such as a cloud-based server, or any other suitable device. In some examples, the user device 104 can be a cellular phone, a smart phone, a tablet, a personal assistant device, a voice assistant device, a digital assistant, a laptop, a computer, or any other suitable device. In various implementations, the data retrieval device 102, including all the modules and databases, is on a central computing system that is operated and/or controlled by a retailer. The data retrieval device 102 may include modules to execute purchases for items selected by customers using the user device 104. Additionally or alternatively, the modules and databases of the data retrieval device 102 are distributed among one or more workstations or servers that are coupled together over the distributed communications system 108.

The databases described can be remote storage devices, such as a cloud-based server, a memory device on another application server, a networked computer, or any other suitable remote storage. Further, in some examples, the databases can be a local storage device, such as a hard drive, a non-volatile memory, or a USB stick.

The distributed communications system 108 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The distributed communications system 108 can provide access to, for example, the Internet.

The user device 104 may communicate with the data retrieval device 102 over the distributed communications system 108. For example, the data retrieval device 102 may host one or more websites. The user device 104 may be operable to view, access and interact with the websites hosted by the data retrieval device 102, such as the code generation user interface generated by the code generation module 112.

Figure 2:
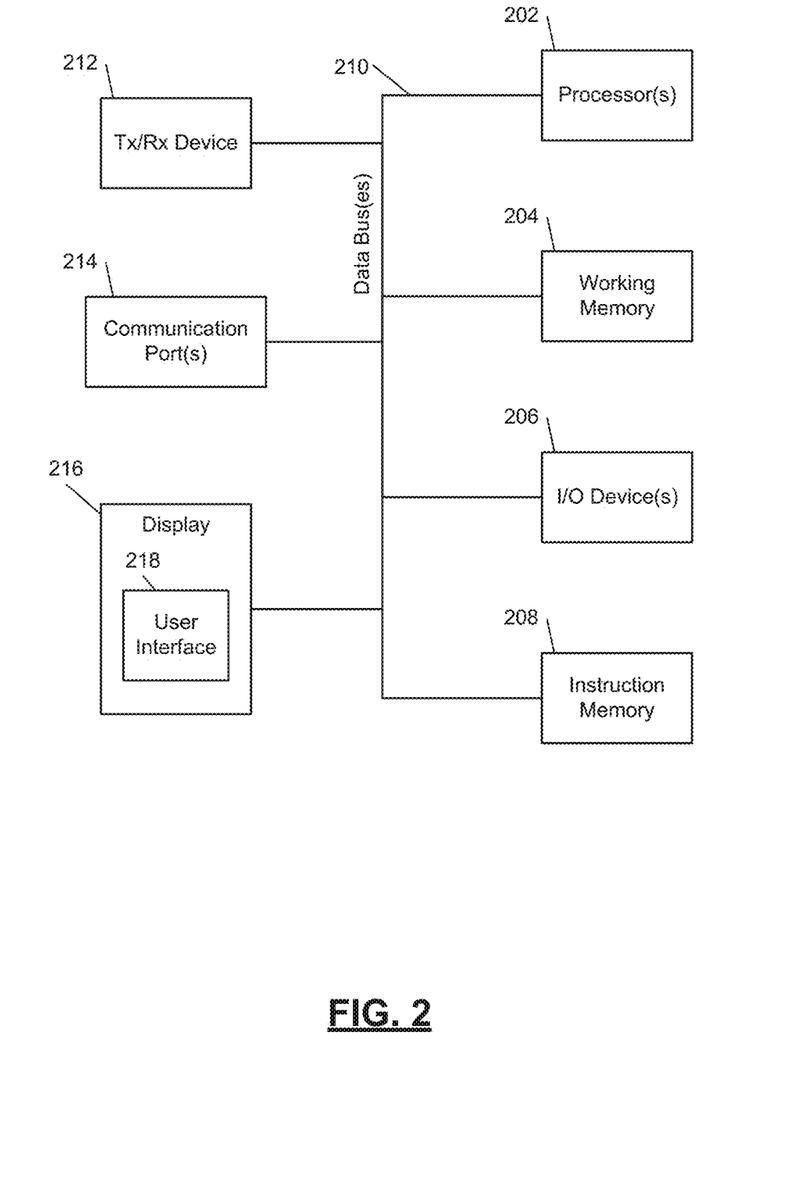
FIG. 2 is a block diagram of a computing device implementing the data retrieval device of FIG. 1 in accordance with some embodiments.

FIG. 2 illustrates an example computing device 200. The data retrieval device 102 and/or the user device 104 may include the features shown in FIG. 2. For the sake of brevity, FIG. 2 is described relative to the data retrieval device 102.

As shown, the data retrieval device 102 can be a computing device 200 that may include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of the data retrieval device 102. Working memory 204 can be a random access memory (RAM) such as a static random access memory (SRAM) or dynamic random access memory (DRAM), or any other suitable memory.

Input/output devices 206 can include any suitable device that allows for data input or output. For example, input-output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as query/search results and customer interaction data.

Display 216 can display a user interface 218. User interface 218 can enable user interaction with the data retrieval device 102. For example, user interface 218 can be a user interface that allows an operator to interact, communicate, control and/or modify different features or parameters of the data retrieval device 102. The user interface 218 can, for example, display the performance of the data retrieval device 102 using different textual, graphical or other types of graphs, tables or the like. In some examples, a user can interact with user interface 218 by engaging input/output devices 206. In some examples, display 216 can be a touchscreen, where user interface 218 is displayed on the touchscreen.

Transceiver 212 allows for communication with a network, such as the distributed communications system 108 of FIG. 1. For example, if the distributed communications system 108 of FIG. 1 is a cellular network, transceiver 212 is configured to allow communications with the cellular network. In some examples, transceiver 212 is selected based on the type of distributed communications system 108 in which the data retrieval device 102 will be operating. Processor(s) 202 is operable to receive data from, or send data to, a network, such as the distributed communications system 108 of FIG. 1, via transceiver 212.

Figure 3A:
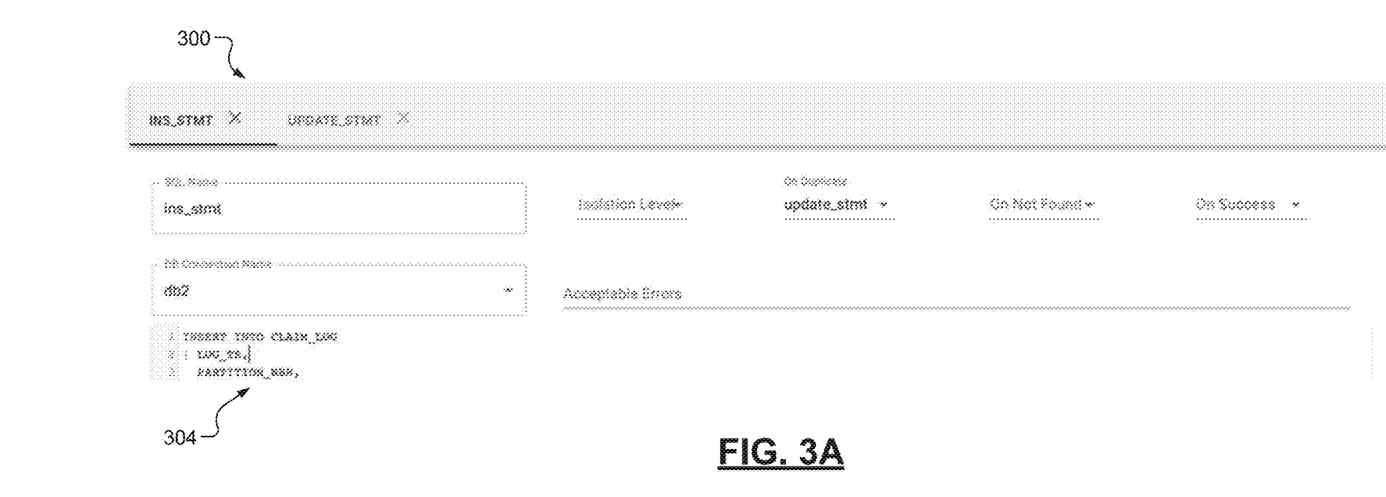
FIGS. 3A and 3B are example user interfaces of the data retrieval device of FIG. 1 in accordance with some embodiments.
Figure 3B:
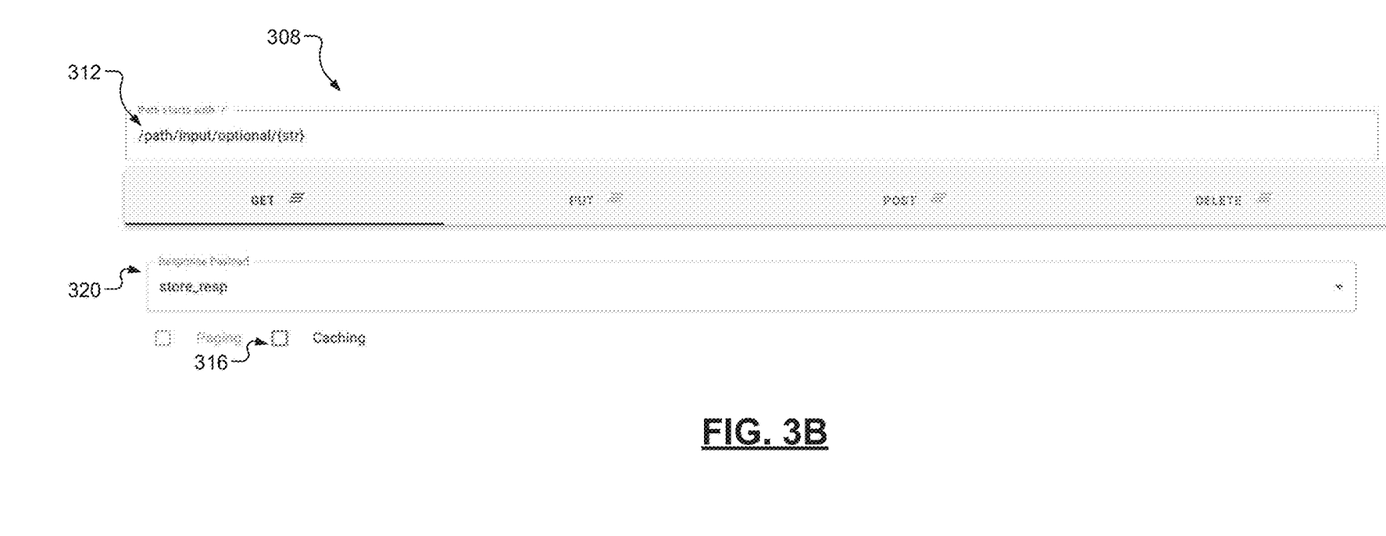

Referring now to FIGS. 3A and 3B, example user interfaces of the data retrieval device of FIG. 1 are shown. A first user interface 300 depicts generation of a data retrieval application. In particular, the first user interface 300 shows data retrieval model selection and option for manipulation or inclusion of conditions. The first user interface 300 shows the inclusion of an insert data retrieval model and an update data retrieval model. Specifically, the insert data retrieval model is shown to be connected to "db2" database and chained to the update data retrieval model, specifying an update instruction of the data retrieval application as a result of a duplicate data. That is, if the execution of the insert instruction of the generated execution steps results in a duplicated, for example, row, the data retrieval application will issue an error. However, since the insert data retrieval model is chained to update the manipulated data if a duplicate is identified, an error will not issue. The first user interface 300 also includes a text alteration area where the user can interact with the user interface and change the data retrieval model, for example, to change a variable name or include a special direction, etc.

A second user interface 308 depicts generation of a set of instructions of the data retrieval application. The second user interface 308 shows where a user can alter a unique URL 312, select a caching option 316, as well as define a response payload 320. The second user interface 308 may also include a text alteration area where the user can adjust the set of instructions to change variable definitions and create a unique data retrieval application.

Figure 4:
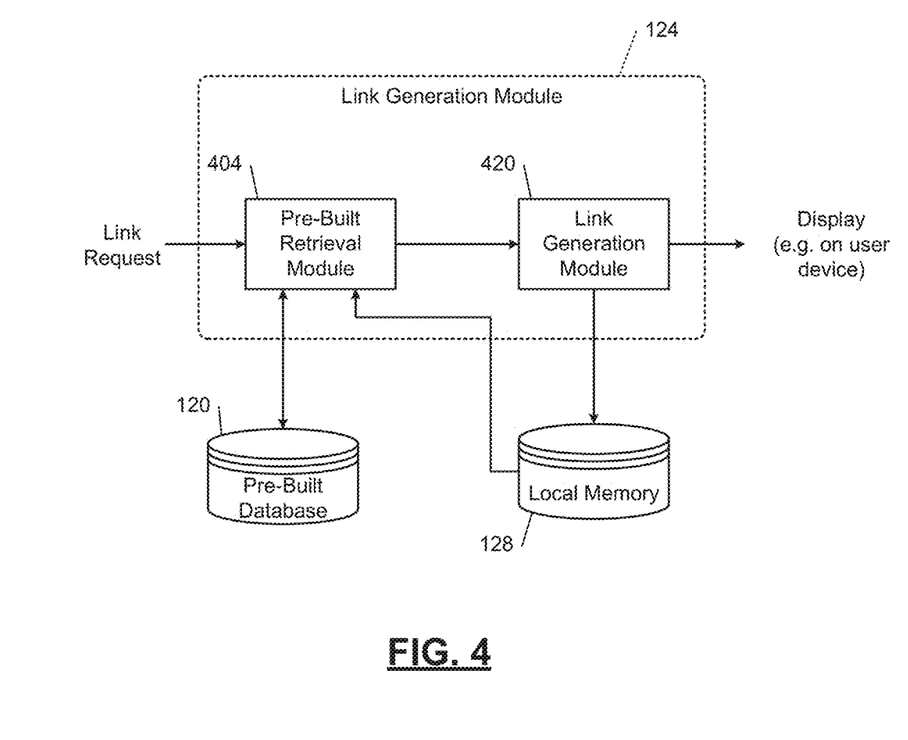
FIG. 4 is a block diagram illustrating an example of a link generation module of the data retrieval device of FIG. 1 in accordance with some embodiments.

Referring now to FIG. 4, a block diagram illustrating an example of the link generation module 124 of the data retrieval device 102 of FIG. 1 is shown. The link generation module 124 includes a pre-built retrieval module 404 that obtains the set of instructions and data retrieval models for the data retrieval application corresponding to the prompting link request. For example, on the code generation user interface, the user has selected a link or build button to instruct the data retrieval device 102 to generate a unique URL linking to the data retrieval application. The obtained pre-built data retrieval application is forwarded to a link generation module 420. The link generation module 420 generates the unique URL based on the user indicated unique URL and associates the unique URL with the set of instructions, which includes the data retrieval models that the user may have changed based on specific data retrieval information used in this particular application. The link generation module 420 forwards the unique URL to a display of the user device. In various implementations, the unique URL points to the set of instructions, which indicate instructions and/or adjustments to the data retrieval models stored in the pre-built database 120. The pre-built retrieval module 404 may also update or generate unique sets of instructions stored in the pre-built database 120 that the unique URL is associated with so that when the unique URL is submitted or entered by a user, the unique set of instructions (adjusted data retrieval models) are executed to build executions steps at runtime (which also may be stored in the local memory 128).

Figure 5:
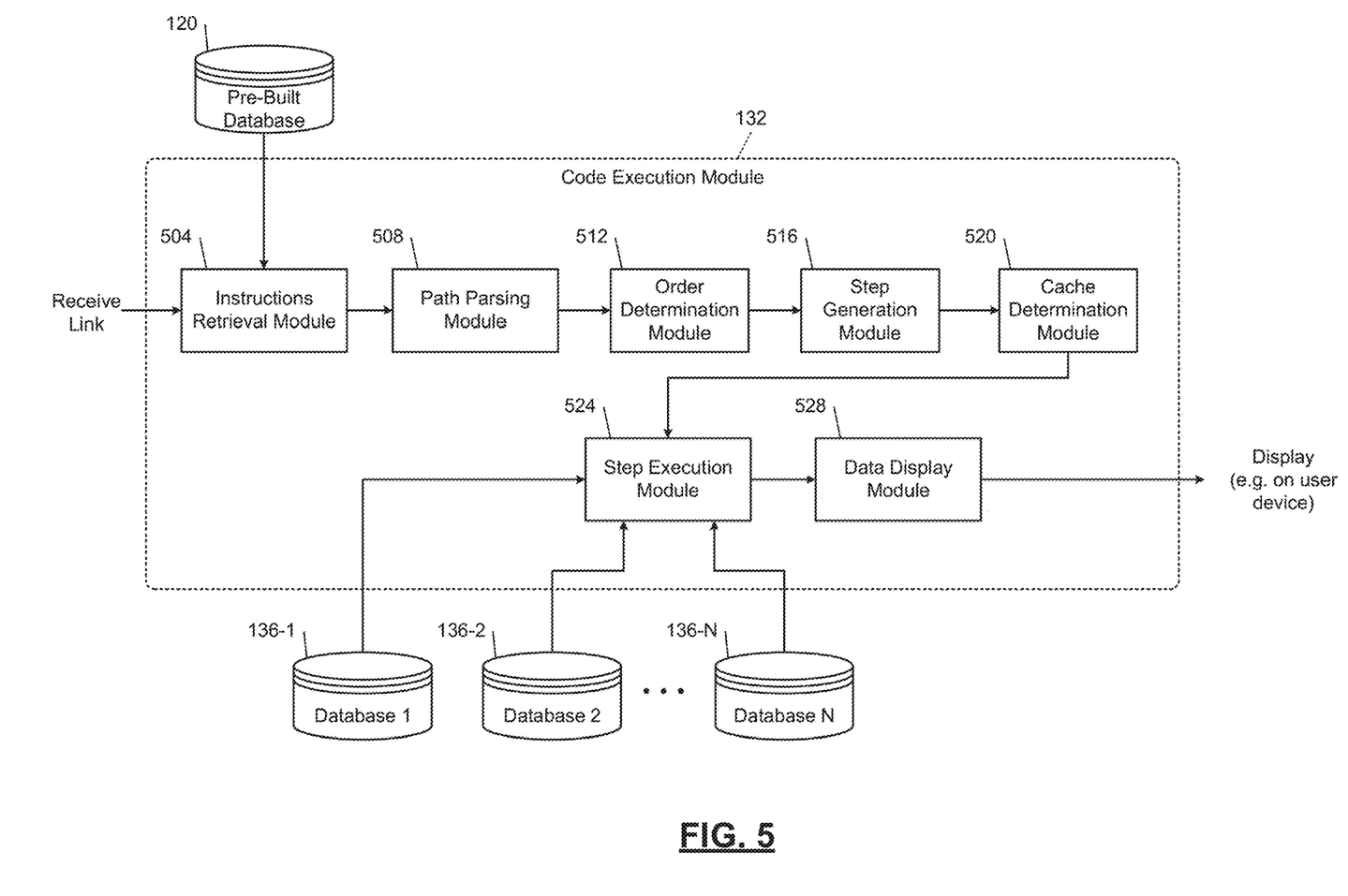
FIG. 5 is a block diagram illustrating an example of a code execution module of the data retrieval device of FIG. 1 in accordance with some embodiments.

Referring now to FIG. 5, a block diagram illustrating an example of the code execution module 132 of the data retrieval device 102 of FIG. 1 is shown. The code execution module 132 includes an instructions retrieval module 504 that, in response to receiving a link, such as the unique URL, retrieves the set of instructions (along with any indicated data retrieval models) associated with the unique URL. The instructions retrieval module 504 forwards the unique URL to a path parsing module 508. The path parsing module 508 identifies a dynamic variable included in the unique URL path to pass to the execution steps. As described previously, the user is able to input different dynamic variables into the unique URL path to retrieve data using the same data retrieval application but from a different, for example, document ID (or invoice ID). This allows the user to use the same data retrieval application to obtain data for a variety of different variables (documents or even including a dynamic variable corresponding to a different type of data retrieved) without the user creating a new data retrieval application.

In various implementations, the instructions retrieval module 504 may also check the local memory 128 (not shown), in response to a link, for a previously loaded unique URL stored from a previous session where code was built and stored in the local memory 128 (not shown) for execution of the locally stored execution steps. Once the set of instructions are retrieved, the set of instructions is sent to an order determination module 512. The order determination module 512 analyzes any dependencies existing in the set of instructions included in the pre-built data retrieval application. For example, if there are no dependencies (that is, a second data retrieval model does not need data obtained by a first retrieval model), the order determination module 512 may indicate to a step generation module 516 to execute the data retrieval models in parallel to reduce processing time. Further, if the order determination module 512 determines that a referenced data retrieval model depends on data from a different data retrieval model, the order determination module 512 may indicate to the step generation module 516 to generate execution steps serially.

The step generation module 516 generates the execution steps for the pre-built data retrieval application. The execution steps are forwarded to a cache determination module 520. Based on user input included in the link request of FIG. 4 and indicated by the unique URL, the cache determination module 520 determines an amount of time to store the response payload (that is, retrieved data). As mentioned previously, the cache user input may indicate to store response payload until a certain time point, for a specific amount of time, etc.

The execution steps, order determination, cache determination, and the dynamic variable are forwarded to a step execution module 524. The step execution module 524 may update the execution steps to include the dynamic variable and execute the steps, obtaining indicated data from an indicated database (such as database 1 136-1, database 2 136-2, . . . , database N 136-N. The retrieved data is forwarded to a data display module 528 to display the obtained data on the user device to the user.

Figure 6:
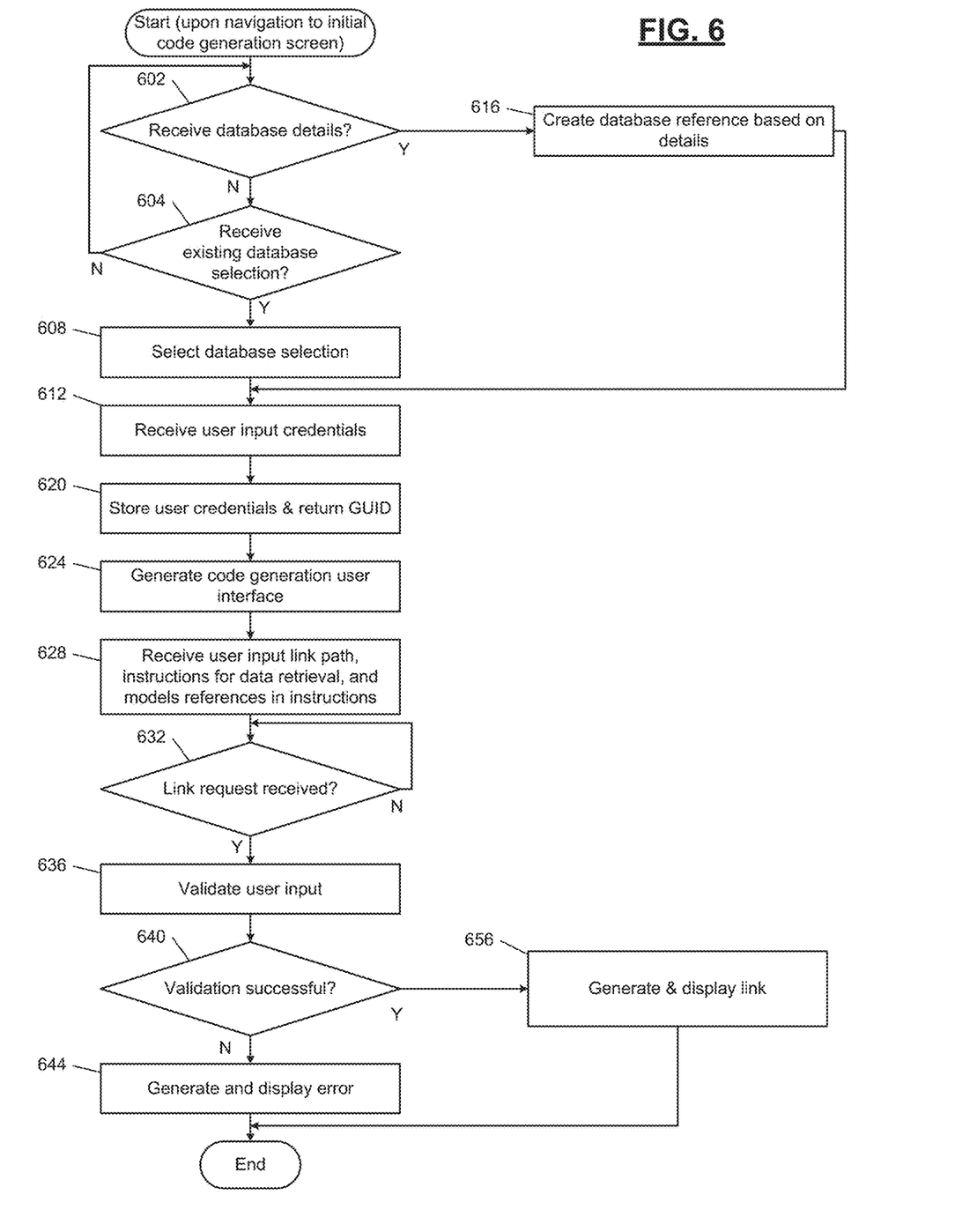
FIG. 6 is a flowchart of example methods of generating a unique URL in accordance with some embodiments.

Referring now to FIG. 6, a flowchart of example methods of generating a unique URL is shown. Control begins upon user navigation to an initial code generation screen, for example, a first screen or user interface on a user device generated by the code generation module. Then, control continues to 602 to determine if database details were received from the user via the user interface. If no, control continues to 604 to determine if an existing data selection was received. That is, if a database has previously been connected, the user interface may include a dropdown menu or a set of database selections from which the user may select. If a database selection is not received, control returns to 602 to wait for database information. If a database selection is received, control proceeds to 608 to select the database selection and proceed to 612 to receive user input credentials.

For example, a user may input a user ID and password to indicate database access details. Returning to 602, if database details are received from the user, control continues to 616 to create a database reference based on the received details and continues to 612. Control proceeds to 620 to store user credentials and returns a globally unique identifier (GUID) that may be indicated in the generated unique URL to identify the data retrieval application being created. Control proceeds to 624 to generate a code generation user interface (for example, as shown in FIGS. 3A and 3B). Control proceeds to 628 to receive user input link path (unique URL), set of instructions for data retrieval, and data retrieval model references, which are also included in the set of instructions. Control continues to 632 to wait for a link request to be received via the code generation user interface.

Once the link request is received, control proceeds to 636 to validate user input. Validation of the user input includes analyzing the set of instructions and data retrieval models (including any special directives) to determine if any errors would result or the instructions could not be executed (for example, check dynamic variables that use regular expressions and conditional checks to determine if the dynamic variables indicate a range when needed, etc.). At 640, control determines if validation is successful. If no, control continues to 644 to generate and display an error message. Then, control ends. Otherwise, if at 640, validation is successful, control proceeds to 656 to generate the unique URL based on the user input link path and display the unique URL to the user on the user interface of the user device. Then, control ends.

Figure 7:
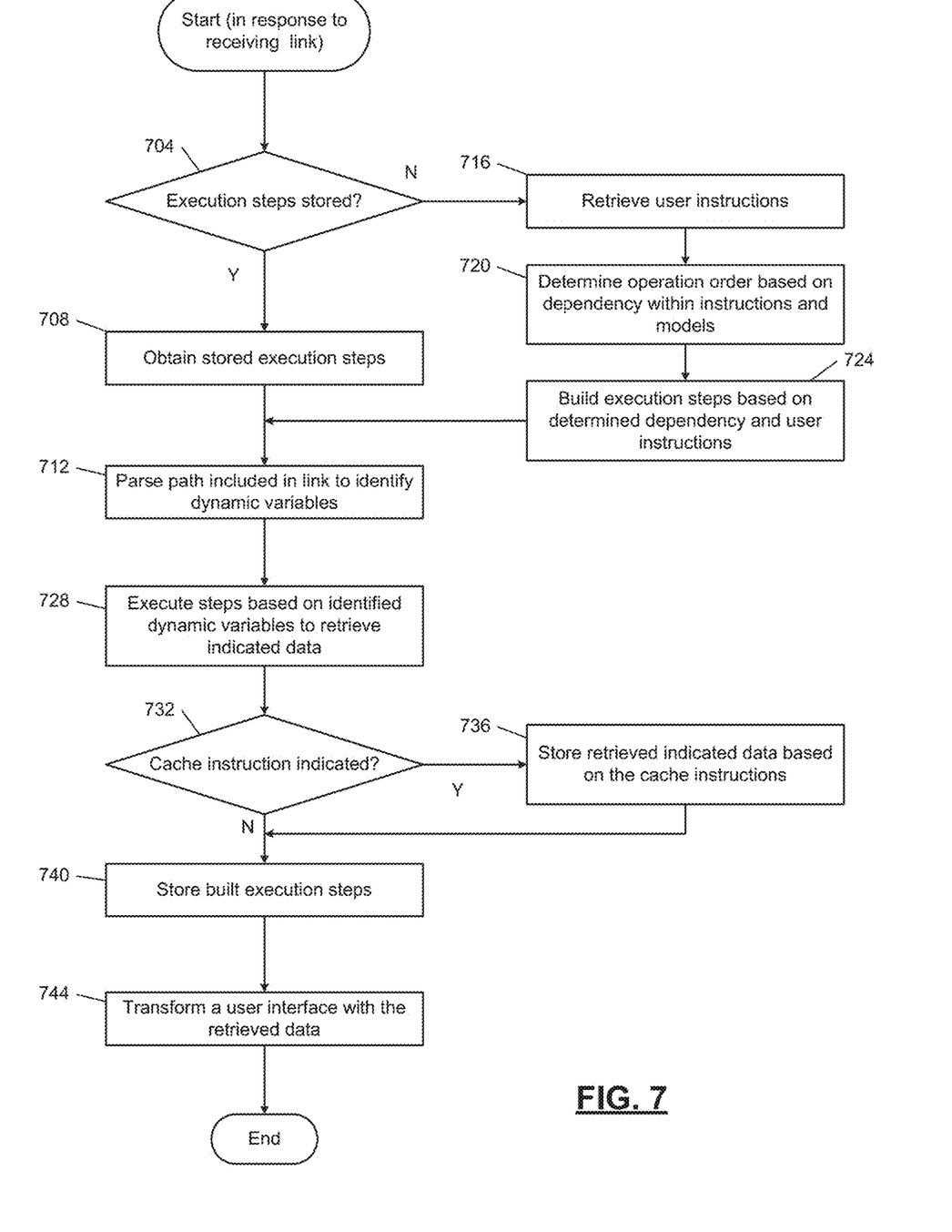
FIG. 7 is a flowchart of example methods of retrieval of dynamic information in accordance with some embodiments.

Referring now to FIG. 7, a flowchart of example methods of retrieval of dynamic information is shown. Control begins in response to receiving a link (that is, the unique URL). Control continues to 704 to determine if the corresponding execution steps of the data retrieval application associated with the link are stored in local memory. If yes, control continues to 708 to obtain the stored execution steps from local memory of the data retrieval application. Then, control proceeds to 712 to parse the path included in the link to identify dynamic variables. Returning to 704, if the execution steps are not stored, control proceeds to 716 to retrieve user instructions (that is, the pre-built data retrieval application including the sets of instructions and data retrieval models associated with the received link/unique URL). Then, control continues to 720 to determine operation order (that is, serially or in parallel) based on dependency within the instructions and models. Control continues to 724 to build executions steps based on determined dependency and user instructions (that is, the sets of instructions and data retrieval models associated with the received link/unique URL). Control then returns to 712. Once the dynamic variables are parsed from the link, control proceeds to 728 to execute the steps based on the identified dynamic variables to retrieve indicated data.

Control continues to 732 to determine if a cache instruction was indicated based on the instructions associated with the received link. If yes, control continues to 736 to store the retrieved indicated data based on the cache instructions in the local memory. For example, as mentioned previously, the retrieved indicated data may be stored for 24 hours, until 6 am, etc. In various implementations, absent cache instructions, a default cache time, for example, 12 hours, may be applied to the retrieved indicated data. Then, control proceeds to 740, which control also proceeds to if a cache instruction is not indicated, to store the built execution steps in the local memory as associated with the received link. Therefore, if the received link is submitted by a user again, control may obtain the execution steps from the local memory instead of re-building the execution steps. In various implementations, the execution steps may not be stored and built each time the received link is submitted. Control continues to 744 to transform a user interface of the user device with the retrieved data.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. The models may include, for example, artificial intelligence, neural networks, deep convolutional and recurrent neural networks. Such neural networks may be made of up of levels of trainable filters, transformations, projections, hashing, pooling and regularization. The models may be used in large-scale relationship-recognition tasks. The models can be created by using various open-source and proprietary machine learning tools known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system, comprising:
a database comprising at least one data retrieval model; and
a computing device configured to:
receive a request to generate a uniform resource locator, wherein the request identifies the at least one data retrieval model;
obtain a set of instructions for generating a set of execution steps including implementation of the at least one data retrieval model;
store the set of instructions in a database;
associate a first uniform resource locator with the set of instructions;
receive a second uniform resource locator from a user device, wherein the second uniform resource locator includes at least a portion of the first uniform resource locator and a dynamic path variable;
parse the second uniform resource locator to identify the dynamic path variable;
obtain the set of instructions from the database based on the first uniform resource locator;
generate the set of execution steps based on the set of instructions, wherein the set of execution steps is modified based on the dynamic path variable;
execute the set of execution steps to retrieve a set of data; and
transmit the set of data to the user device, wherein the user device is configured, in response to receiving the set of data, to store the set of data in local memory and transform a user interface of the user device based on the set of data.

2. The system of claim 1, wherein the at least one data retrieval model comprises a first data retrieval model and a second data retrieval model, and wherein the computing device is configured to:
determine the first data retrieval model is independent of the second data retrieval model; and
generate a first set of execution steps corresponding to the first data retrieval model and a second set of execution steps corresponding to the second data retrieval model, wherein the first set of execution steps and the second set of execution steps are executed in parallel.

3. The system of claim 1, wherein the set of instructions includes input from the user device indicating: at least one database, a query string variable, a header value variable, or a request payload variable.

4. The system of claim 1, wherein:
the set of instructions indicate data to retrieve from at least one database, and
the at least one data retrieval model indicates a location of the set of data to retrieve.

5. The system of claim 1, wherein the set of instructions include a predetermined set of instructions stored in the database.

6. The system of claim 1, wherein the user device is configured to store the set of data for a threshold period.

7. A method comprising:
receiving a request to generate a uniform resource locator, wherein the request identifies at least one data retrieval model;
obtaining a set of instructions for generating a set of execution steps including implementation of the at least one data retrieval model;
storing the set of instructions in a database;
associating a first uniform resource locator with the set of instructions;
receiving a second uniform resource locator from a user device, wherein the second uniform resource locator includes at least a portion of the first uniform resource locator and a dynamic path variable;
parsing the second uniform resource locator to identify the dynamic path variable;
obtaining the set of instructions from the database based on the first uniform resource locator;
generating the set of execution steps based on the set of instructions, wherein the set of execution steps is modified based on the dynamic path variable;
executing the set of execution steps to retrieve a set of data; and
transmitting the set of data to the user device, wherein the user device is configured, in response to receiving the set of data, to store the set of data in local memory and transform a user interface of the user device based on the set of data.

8. The method of claim 7, wherein the at least one data retrieval model comprises a first data retrieval model and a second data retrieval model, the method further comprising:
determining the first data retrieval model is independent of the second data retrieval model; and
generating a first set of execution steps corresponding to the first data retrieval model and a second set of execution steps corresponding to the second data retrieval model, wherein the first set of execution steps and the second set of execution steps are executed in parallel.

9. The method of claim 7, wherein the set of instructions includes input from the user device indicating: at least one database, a query string variable, a header value variable, or a request payload variable.

10. The method of claim 7, wherein:
the set of instructions indicate data to retrieve from at least one database, and
the at least one data retrieval model indicates a location of the set of data to retrieve.

11. The method of claim 7, wherein the set of instructions include a predetermined set of instructions stored in the database.

12. The method of claim 7, wherein the user device stores the set of data for a threshold period.

13. A non-transitory computer readable medium having instructions stored thereon, wherein the instructions, when executed by at least one processor, cause a device to perform operations comprising:
receiving a request to generate a uniform resource locator, wherein the request identifies at least one data retrieval model;
obtaining a set of instructions for generating a set of execution steps including implementation of the at least one data retrieval model;
storing the set of instructions in a database;
associating a first uniform resource locator with the set of instructions;
receiving second uniform resource locator from a user device, wherein the second uniform resource locator includes at least a portion of the first uniform resource locator and a dynamic path variable;
parsing the second uniform resource locator to identify the dynamic path variable;
obtaining the set of instructions from the database based on the first uniform resource locator;
generating the set of execution steps based on the set of instructions, wherein the set of execution steps is modified based on the dynamic path variable;
executing the set of execution steps to retrieve a set of data; and
transmitting the set of data to the user device, wherein the user device is configured, in response to receiving the set of data, to store the set of data in local memory and transform a user interface of the user device based on the set of data.

14. The non-transitory computer readable medium of claim 13, wherein the at least one data retrieval model comprises a first data retrieval model and a second data retrieval model, and wherein the instructions cause the device to perform operations comprising:
determining the first data retrieval model is independent of the second data retrieval model; and
generating a first set of execution steps corresponding to the first data retrieval model and a second set of execution steps corresponding to the second data retrieval model, wherein the first set of execution steps and the second set of execution steps are executed in parallel.

15. The non-transitory computer readable medium of claim 13, wherein the set of instructions includes input from the user device indicating: at least one database, a query string variable, a header value variable, or a request payload variable.

16. The non-transitory computer readable medium of claim 13, wherein:
the set of instructions indicate data to retrieve from at least one database, and
the at least one data retrieval model indicates a location of the set of data to retrieve.

17. The non-transitory computer readable medium of claim 13, wherein the set of execution steps include a predetermined set of instructions.

18. The system of claim 1, wherein the dynamic path variable includes at least one special directive configured to replace at least one variable in the at least one data retrieval model.

19. The method of claim 7, wherein the dynamic path variable includes at least one special directive configured to replace at least one variable in the at least one data retrieval model.

20. The non-transitory computer readable medium of claim 13, wherein the dynamic path variable includes at least one special directive configured to replace at least one variable in the at least one data retrieval model.

* * * * *